(12) United States Patent
Matsui et al.

(10) Patent No.: US 10,537,953 B2
(45) Date of Patent: Jan. 21, 2020

(54) ARC WELDING CONTROL METHOD AND ARC WELDING APPARATUS

(71) Applicant: Panasonic Intellectual Property Management Co., Ltd., Osaka (JP)

(72) Inventors: Kaito Matsui, Osaka (JP); Atsuhiro Kawamoto, Hyogo (JP); Takahiro Noguchi, Osaka (JP); Masaru Kowa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 134 days.

(21) Appl. No.: 15/518,496

(22) PCT Filed: Nov. 2, 2015

(86) PCT No.: PCT/JP2015/005495
§ 371 (c)(1),
(2) Date: Apr. 12, 2017

(87) PCT Pub. No.: WO2016/075891
PCT Pub. Date: May 19, 2016

(65) Prior Publication Data
US 2017/0232542 A1  Aug. 17, 2017

(30) Foreign Application Priority Data
Nov. 12, 2014  (JP) ................. 2014-229389

(51) Int. Cl.
*B23K 9/10* (2006.01)
*B23K 9/073* (2006.01)
*B23K 9/095* (2006.01)

(52) U.S. Cl.
CPC ............. *B23K 9/073* (2013.01); *B23K 9/095* (2013.01)

(58) Field of Classification Search
CPC . B23K 9/00; B23K 9/06; B23K 9/067; B23K 9/0671; B23K 9/073–0738;
(Continued)

(56) References Cited

U.S. PATENT DOCUMENTS

| | | | |
|---|---|---|---|
| 3,524,041 A * | 8/1970 | Manz ................... | B23K 9/092 219/130.51 |
| 2012/0255940 A1* | 10/2012 | Fujiwara ............... | B23K 9/09 219/137 R |
| 2014/0203004 A1* | 7/2014 | Matsuoka ............. | B23K 9/092 219/130.01 |

FOREIGN PATENT DOCUMENTS

| | | |
|---|---|---|
| CN | 103958106 | 7/2014 |
| JP | 2002-248573 | 9/2002 |
| WO | WO201313145569 | * 10/2013 |

OTHER PUBLICATIONS

English Translation of Chinese Search Report dated Apr. 3, 2018 in Chinese Patent Application No. 201580059752.8.
(Continued)

*Primary Examiner* — Sang Y Paik
(74) *Attorney, Agent, or Firm* — Wenderoth, Lind & Ponack, L.L.P.

(57) ABSTRACT

In control applying a gradient to a command voltage value during an arc period, although stable welding can be performed even in a case where a protrusion length of a welding wire becomes long, when the disturbance such as sudden change in the protrusion length is generated, a current waveform of the arc period is undershot, the short circuit period is disturbed, and it took time to return to the stable state, and the amount of sputter generation is also increased. Therefore, it is possible to suppress a change in current such as undershoot or the like when the disturbance is generated, stabilize short circuit cycle, perform welding with a strong resistance to disturbance and a small amount of sputter (Continued)

generation by changing an inductance value a plurality of times during the arc period.

4 Claims, 5 Drawing Sheets

(58) Field of Classification Search
CPC .......... B23K 9/10; B23K 9/1006–1037; B23K 9/1075; B23K 9/09; B23K 9/095
USPC .................. 219/130.01–130.51, 136–137 PS
See application file for complete search history.

(56) References Cited

OTHER PUBLICATIONS

Extended European Search Report dated Dec. 1, 2017 in European Patent Application No. 15859534.8.
International Search Report of PCT application No. PCT/JP2015/005495 dated Jan. 19, 2016.

\* cited by examiner

ARC WELDING CONTROL METHOD AND ARC WELDING APPARATUS

This application is a U.S. national stage application of the PCT International Application No. PCT/JP2015/005495 filed on Nov. 2, 2015, which claims the benefit of foreign priority of Japanese patent application 2014-229389 filed on Nov. 12, 2014, the contents all of which are incorporated herein by reference.

FIELD OF THE INVENTION

The present disclosure relates to an arc welding control method and an arc welding apparatus for performing welding by generating an arc between a welding wire as a consumable electrode and a base material as a material to be welded.

DESCRIPTION OF THE RELATED ART

FIG. 5 is a diagram illustrating an output waveform in an arc welding control method involving with a short circuit in the related art. Time changes of welding current Aw, welding voltage Vw, and welding voltage command value Va are illustrated from the top in order. Hereinafter, description will be made with reference to FIG. 5.

In FIG. 5, a period from time t1 to time t2 is an arc period in which arc is generated between a welding wire and a base material and a period from time t2 to time t3 is a short circuit period in which the welding wire and the base material are short-circuited. In the arc period, welding is performed using welding voltage command value Va which is reduced at a predetermined attenuation gradient for a predetermined time from the arc generation after the short circuit. Accordingly, since an output voltage reduces according to the welding voltage command value, even in a case where a protrusion length of the welding wire from a tip of a chip becomes long, the arc period does not become long and can be shifted to a short-circuit state in a short time.

In addition, welding is performed by changing the predetermined time and the attenuation gradient in accordance with welding current values having different numbers of short circuits. Accordingly, since the output voltage reduces according to the welding voltage command value, even in a case where the protrusion length becomes long, the arc period does not become long and can shift to the short circuit state in a short time.

As described above, stable welding can be performed even in a case where the protrusion length becomes long by changing the attenuation gradient of the welding voltage command value and a predetermined time applying the attenuation gradient according to the welding current in the arc period (see, for example, PTL 1).

CITATION LIST

Patent Literature

PTL 1: Japanese Patent Unexamined Publication No. 2002-248573

SUMMARY OF THE INVENTION

An arc welding control method according to the present disclosure is an arc welding control method that performs arc welding by repeating a short circuit period and an arc period and changes an inductance value associated with a welding output according to a current region of a welding current during the arc period. Voltage control is performed using a first inductance value during a predetermined time from the time of start of the arc period, voltage control is performed by changing the first inductance value to a second inductance value less than the first inductance value after lapse of the predetermined time, and inductance value is changed a plurality of times during the arc period.

In addition, an arc welding apparatus of the present disclosure is an arc welding apparatus that performs arc welding by repeating a short circuit period and an arc period and includes a primary side rectifier for rectifying input power; a switching unit for converting an output of the primary side rectifier into alternating current; a main transformer for stepping down an output of the switching unit; and a secondary side rectifier for rectifying an output of the main transformer, and a reactor. Further, a driver for controlling the switching unit; a welding voltage detector for detecting a welding voltage; a welding current detector for detecting a welding current; a short circuit/arc detector for detecting a short circuit state or an arc state based on an output of the welding voltage detector; and a short circuit controller for performing control of a welding output during the short circuit period based on an output of the short circuit/arc detector are included. Further, an arc controller for performing control of a welding output during the arc period based on the output of the short circuit/arc detector; a timekeeper for measuring an elapsed time from a start of the arc period; and an electronic reactor controller that controls an inductance value are included. The inductance value associated with the welding output is changed corresponding to the current region of the welding current during the arc period, voltage control is performed using a first inductance value during the predetermined time from the start of the arc period, and the voltage value is performed by changing the first inductance value to a second inductance value less than the first inductance value after lapse of the predetermined time.

DETAILED DESCRIPTION OF THE PREFERRED EMBODIMENTS

In an arc welding control method in the related art, since only a welding voltage command value is changed, there is a problem that an arc becomes unstable in a case where the protrusion length of the welding wire is suddenly changed and it takes long time to return to a stable state in the case. In addition, since an inductance value is determined by a reactor in the arc welding apparatus, it is difficult to stabilize the arc in the whole range from low current to high current.

Embodiment 1

Hereinafter, an embodiment of the present disclosure will be described using FIG. 1 to FIG. 4.

Figure 4:
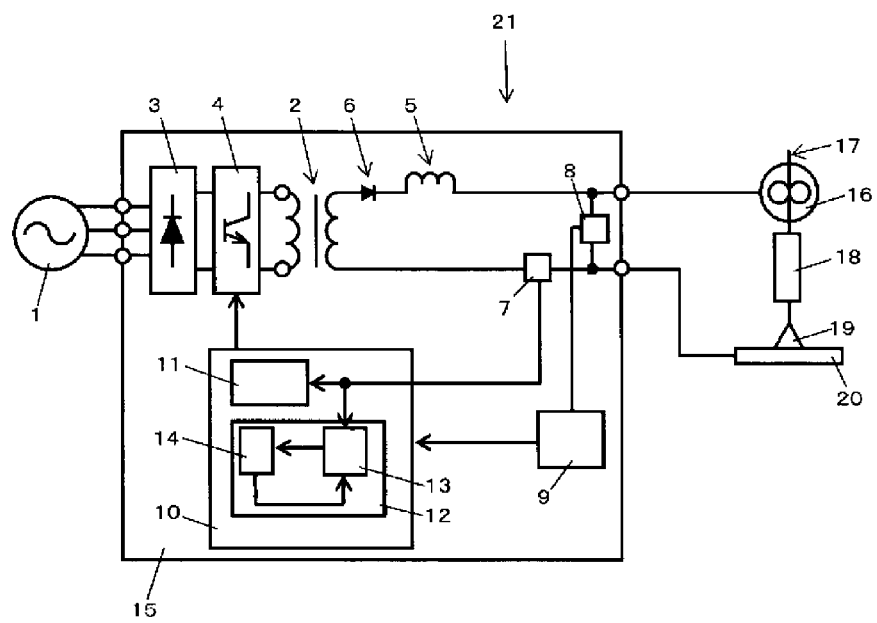
FIG. 4 is a view illustrating a schematic configuration of an arc welding apparatus according to Embodiment 1 of the present disclosure.
Figure 5:
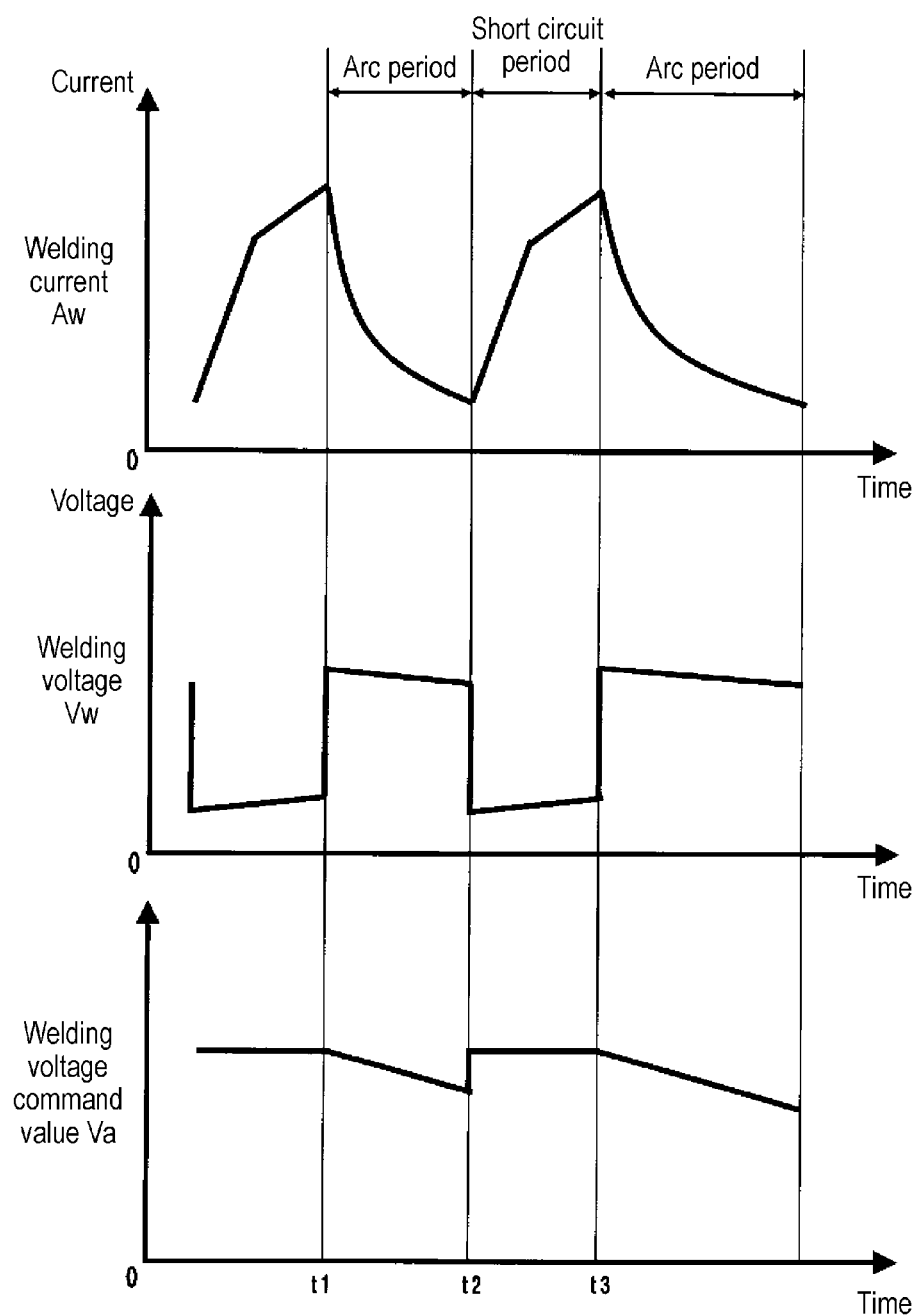
FIG. 5 is a diagram illustrating an output waveform by the arc welding control method in the related art.

First, an arc welding apparatus that performs an arc welding control method of the present embodiment will be described using FIG. 4. FIG. 4 is a diagram illustrating a schematic configuration of arc welding apparatus 21. Arc welding apparatus 21 performs welding by repeating an arc state and a short circuit state between welding wire 17 as a consumable electrode and base material 20.

Welding power supply 15 of arc welding apparatus 21 includes main transformer 2, primary side rectifier 3, switching unit 4, reactor 5, secondary side rectifier 6, welding current detector 7, welding voltage detector 8, short circuit/arc detector 9, and output controller 10. Output controller 10 includes short circuit controller 11 and arc controller 12. Arc controller 12 includes electronic reactor controller 13 and timekeeper 14.

Primary side rectifier 3 rectifies an input voltage inputted from input power supply 1 outside welding power supply 15. Switching unit 4 controls an output of primary side rectifier 3 to an output suitable for welding. The main transformer 2 converts an output of the switching unit 4 into an output suitable for welding. Secondary side rectifier 6 rectifies an output of main transforming section 2. Reactor 5 smoothes an output of secondary side rectifier 6 to a current suitable for welding. Reactor 5 is a direct current reactor, and an inductance value is fixed. Welding current detector 7 detects a welding current. Welding voltage detector 8 detects a welding voltage. Short circuit/arc detector 9 determines whether a welding state is in the short circuit state in which welding wire 17 and base material 20 are short-circuited, or in the arc state in which arc 19 is generated between welding wire 17 and base material 20, based on an output of welding voltage detector 8. Output controller 10 outputs a control signal to switching unit 4 to control the welding output. Short circuit controller 11 performs control of the short circuit current that is the welding current during the short circuit period, in a case of determining that short circuit/arc detector 9 is in the short circuit state. Arc controller 12 performs control of the arc current which is the welding current during the arc period, in a case of determining that short circuit/arc detector 9 is in the arc state. In addition, arc controller 12 includes electronic reactor controller 13 and timekeeper 14, the number of times to change the inductance value and the inductance value are determined by electronic reactor controller 13, and time when the inductance value is output is determined by timekeeper 14.

In addition, welding wire 17 is output in a direction of base material 20 by wire feed motor 16, power is supplied via chip 18, arc 19 is generated between welding wire 17 and base material 20, and thus welding is performed.

Figure 1:
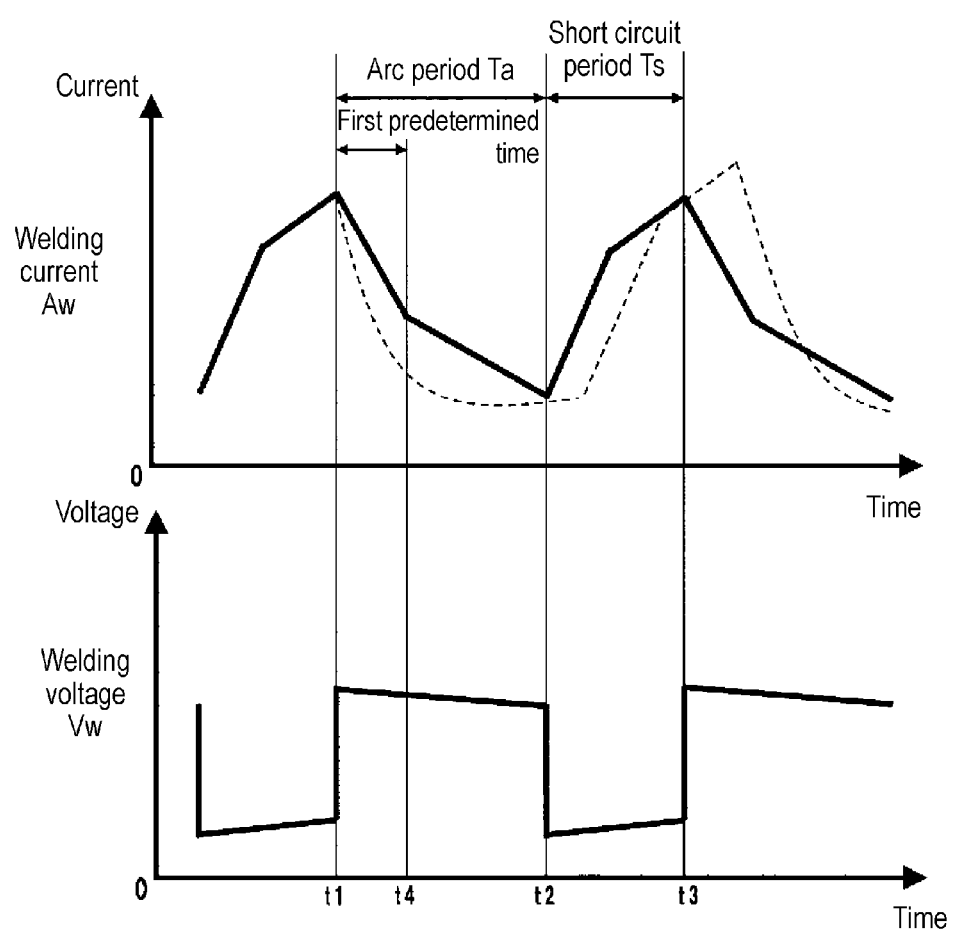
FIG. 1 is a diagram illustrating an output waveform by an arc welding control method according to Embodiment 1 of the present disclosure.

Next, an operation of arc welding apparatus 21 configured as described above will be described using FIG. 1. In FIG. 1, time t1 indicates a point in time when an arc is generated, time t2 indicates a point in time when a short circuit is generated, and time t3 indicates a point in time when a short circuit is opened and an arc is generated again. In addition, a waveform indicated by a dotted line is a current waveform by the control in the related art. A period from time t1 to time t2 is arc period Ta, and a period from time t2 to time t3 is a short circuit period. The voltage is controlled from a point in time when an arc is generated at time t1 during arc period Ta and the voltage control is continued during a period until the next short circuit is generated at time t2. During the short circuit period from time t2 to time t3, short circuit controller 11 supplies a welding current to welding wire 17 for opening the short circuit which releases a state where welding wire 17 is short-circuited with a melting pool formed in base material 20. The current control is performed during the short circuit period.

Control of arc period Ta from time t1 to time t2 in FIG. 1 will be described. A period from time t1 to time t4 and a period from time t4 to time t2 which is a point in time when the next short circuit is generated are controlled using the different inductance values. Accordingly, in a case where a change in the protrusion length is likely to be generated due to hand shake or the like particularly at the time of manual welding or even in a case where there is a disturbance such as magnetic blow generated by a sudden change in the protrusion length of the welding wire 17 from chip 18 or a state of base material 20 or the like, it is possible to decrease a change in the current waveform such as undershoot and realize arc welding with a strong resistant to the disturbance. Further, since the change in current is small and the short circuit period is stable, the amount of sputter generated when the arc is disturbed can be decreased. In the control in the related art, when the current during arc period Ta is undershoot, since the time of arc period Ta becomes long, the droplet at the tip of the welding wire becomes large, and a higher current is required to release the short circuit, the time of the short circuit period also became long, and the disturbance of the short circuit period is generated. The inductance value during the period from time t1 to time t4 is referred to as a first inductance and the inductance value during the period from time t4 to time t2 is referred to as a second inductance. A time controlled by the first inductance during the period from time t1 to time t4 is referred to as a first predetermined time. The inductance value is determined to be changeable by electronic reactor controller 13, and the predetermined time is determined by timekeeper 14.

Constant voltage control is performed by the voltage control during the arc period, suppression of sputter generation is performed using the first inductance at the first predetermined period during the period from time t1 to time t4, and stable droplet formation and suppression of undershoot are performed using the second inductance during the period from time t4 to time t2 after the elapse of the first predetermined time.

In the short circuit period, the inductance is switched to the inductance in the short circuit period, the current control is performed, and constant current control is performed which controls the welding current using one or more constant increasing gradient toward the short circuit opening in order to stabilize the droplet detachment and to stabilize the short circuit opening.

Figure 2:
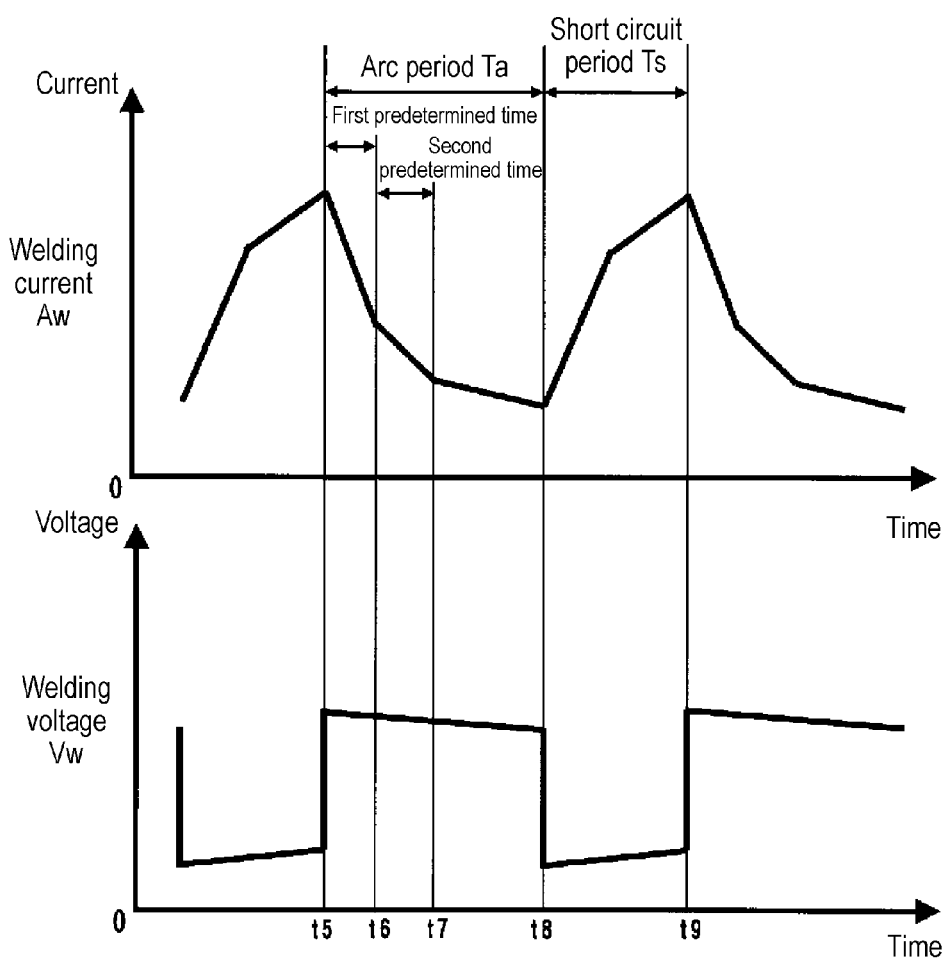
FIG. 2 is a diagram illustrating an output waveform according to the arc welding control method according to Embodiment 1 of the present disclosure.

In addition, the inductance value determined by the electronic reactor controller may be controlled by a plurality of times such as three or more times as shown in FIG. 2. In FIG. 2, a period from time t5 to time t6, a period from time t6 to time t7, and a period from time t7 to time t8 which is a time when next short circuit is generated are controlled using different inductance values. Accordingly, the current can be decreased by being gradually stabilized, the change in current is more decreased when the disturbance is generated, and a more stable arc can be realized than when it is controlled using two inductance values. The inductance value during the period from time t5 to time t6 is referred to as a first inductance, the inductance value during the period from time t6 to time t7 is referred to as a second inductance, and the inductance value during the period from time t7 to time t8 is referred to as a third inductance. A time controlled using the first inductance from time t5 to time t6 is referred to as a first predetermined time and a time controlled using the second inductance from time t6 to time t7 is referred to as a second predetermined time. The inductance value is determined by electronic reactor controller 13, and the predetermined time is determined by timekeeper 14.

Figure 3A:
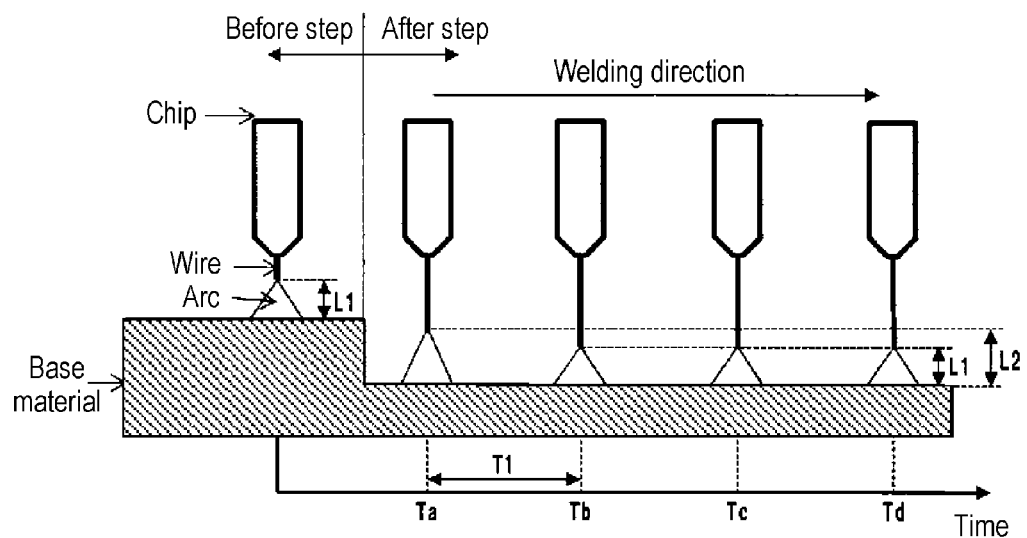
FIG. 3A is a view illustrating a change in an arc length by the arc welding control method according to Embodiment 1 of the present disclosure.
Figure 3B:
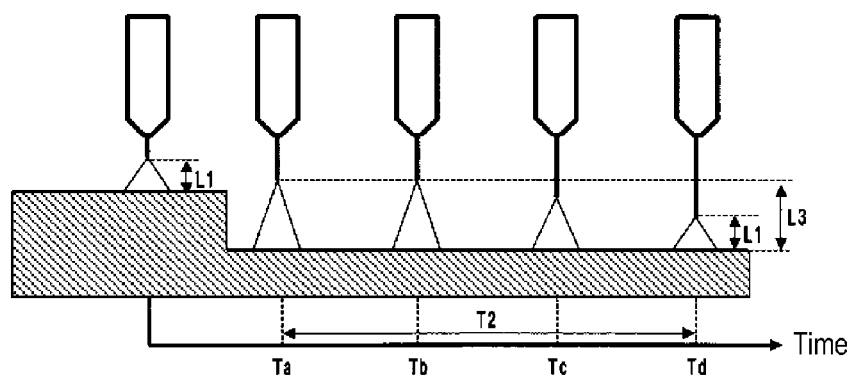
FIG. 3B is a view illustrating a change in an arc length according to an arc welding control method in the related art.

Reason why the inductance value is changed and controlled in the arc period will be described using FIG. 3A and FIG. 3B. FIG. 3A and FIG. 3B are diagrams illustrating changes in an arc length (L1 to L3) when the base material 20 having a step is welded. As the step is lowered, the protrusion length of welding wire 17 from chip 18 is changed, an arc becomes a unstable state and it tends to take time to return to the stable state. FIG. 3A illustrates the arc welding control according to the present disclosure, and FIG. 3B illustrates the arc welding control in the related art. Let the arc length before the step is lowered be L1, and compare the time until the arc length returns to L1 after the step is lowered. In addition, let a point in time immediately after the step is lowered be Ta, and the subsequent points in time be Tb, Tc, and Td. The time from the point in time Ta to the point in time Tb, the time from the point in time Tb to the point in time Tc, and the time from the point in time Tc to the point in time Td are the same. In FIG. 3A, the arc length at the point in time Ta immediately after the step is lowered becomes longer from L1 to L2. Thereafter, the arc length returns from L2 to L1 at time Tb. Let the time taken at this time be T1. In FIG. 3B, the arc length at the point in time Ta immediately after the step is lowered becomes longer from L1 to L3. Thereafter, the arc length returns from L3 to L1 at the point in time Td. Let the time taken at this time be T2. The length of the arc length is increased in the order of L1<L2<L3. Accordingly, by changing and controlling the inductance value during the arc period, it is possible to decrease the change in the arc length immediately after the step is lowered compared with the control in the related art, and further, a time when the changed arc length returns to the original arc length can be decreased to about ⅓.

Since the inductance value is determined by a table or a mathematical formula depending on the set current of the welding current or the set wire feeding speed, the appropriate inductance value for each current region can be set to correspond to the current region of the welding current. For example, it may be better to decrease the inductance value in a low current region of 150 A or less, and it may be better to increase the inductance value in a high current region of 250 A or more. The inductance value is determined by experiments or the like, for example, in arc period Ta, the second inductance value is controlled to a value smaller than the first inductance value so as to gradually reduce the gradient of the waveform of the welding current.

As described above, an inductance value associated with the welding output is changed corresponding to the current region of the welding current during the arc period, voltage control is performed using a first inductance value during a predetermined time from the time of start of the arc period, and the voltage control is performed by changing to a second inductance value less than the first inductance value after lapse of the predetermined time, and the inductance value is changed a plurality of times during the arc period.

In this way, it is possible to suppress a change in current such as undershoot and to maintain a stable arc state even in a case where the protrusion length of the welding wire suddenly changes.

The inductance value associated with the welding output in arc period Ta is an added value of the inductance value of reactor 5 and the inductance value determined by the electronic reactor controller.

As described above, according to the arc welding control method and the arc welding apparatus of the present embodiment, the inductance value of the arc period is changed according to the current region a plurality of times. Accordingly, by changing the inductance value during the arc period, it is possible to maintain a stable arc state even in a case where the protrusion length of the welding wire suddenly changes, and also to stabilize the arc in the whole region.

In addition, welding with a strong resistance to disturbance and a small amount of sputter generation can be realized by the change in current such as undershoot being suppressed when the disturbance is generated and cycle between the short circuit period Ts and the arc period Ta being stabilized and kept constant. Further, since the inductance value can be selected according to the current range of the welding current, the stability of the arc can be enhanced in the whole current range from a low current to a high current.

According to the present disclosure, an arc welding control method and an arc welding control apparatus are industrially useful which can decrease sputter and improve arc stability, realize high quality bead appearance by changing an inductance value during an arc period and performs welding by an arc being generated between a welding wire as a consumable electrode and a base material as a material to be welded.

The invention claimed is:

1. An arc welding control method in which arc welding is performed by repeating a short circuit period and an arc period, the method comprising:
   during the arc period,
      changing an inductance value associated with a welding output, the changing the inductance value including
         using, as the inductance value, a first inductance value during a first time interval, the first time interval beginning from a start of the arc period and ending at a predetermined time after the start of the arc period, and
         changing the first inductance value to a second inductance value less than the first inductance value so that the second inductance value is used during a second time interval, the second time interval beginning at the predetermined time after the start of the arc period; and
      performing constant voltage control during the arc period from a time of the start of the arc period,
   wherein the inductance value is changed a plurality of times during the arc period.

2. The arc welding control method of claim 1, wherein the inductance value is changed by electronic reactor control.

3. The arc welding control method of claim 1, wherein the inductance value is an added value of an inductance value of a reactor of an arc welding apparatus and an inductance value of an electronic reactor.

4. An arc welding apparatus for performing arc welding by repeating a short circuit period and an arc period, the arc welding apparatus comprising:
   a primary side rectifier for rectifying input power;
   a switching unit for converting an output of the primary side rectifier to an alternating current;

a main transformer for stepping down an output of the switching unit;
a secondary side rectifier for rectifying an output of the main transformer, and a reactor;
a driver for controlling the switching unit;
a welding voltage detector for detecting a welding voltage;
a welding current detector for detecting a welding current;
a short circuit/arc detector for detecting a short-circuit state or an arc state based on an output of the welding voltage detector;
a short circuit controller for controlling a welding output during the short circuit period based on an output of the short circuit/arc detector;
an arc controller for controlling a welding output during the arc period based on the output of the short circuit/arc detector;
a timekeeper for measuring an elapsed time from a start of the arc period; and
an electronic reactor controller for controlling an inductance value,
wherein during the arc period,
an inductance value associated with a welding output is changed,
a first inductance value is used, as the inductance value, during a first time interval, the first time interval beginning from a start of the arc period and ending at a predetermined time after the start of the arc period,
the first inductance value is changed to a second inductance value less than the first inductance value so that the second inductance value is used during a second time interval, the second time interval beginning at the predetermined time after the start of the arc period, and
constant voltage control is performed during the arc period from a time of the start of the arc period.

* * * * *